Patented Sept. 12, 1933

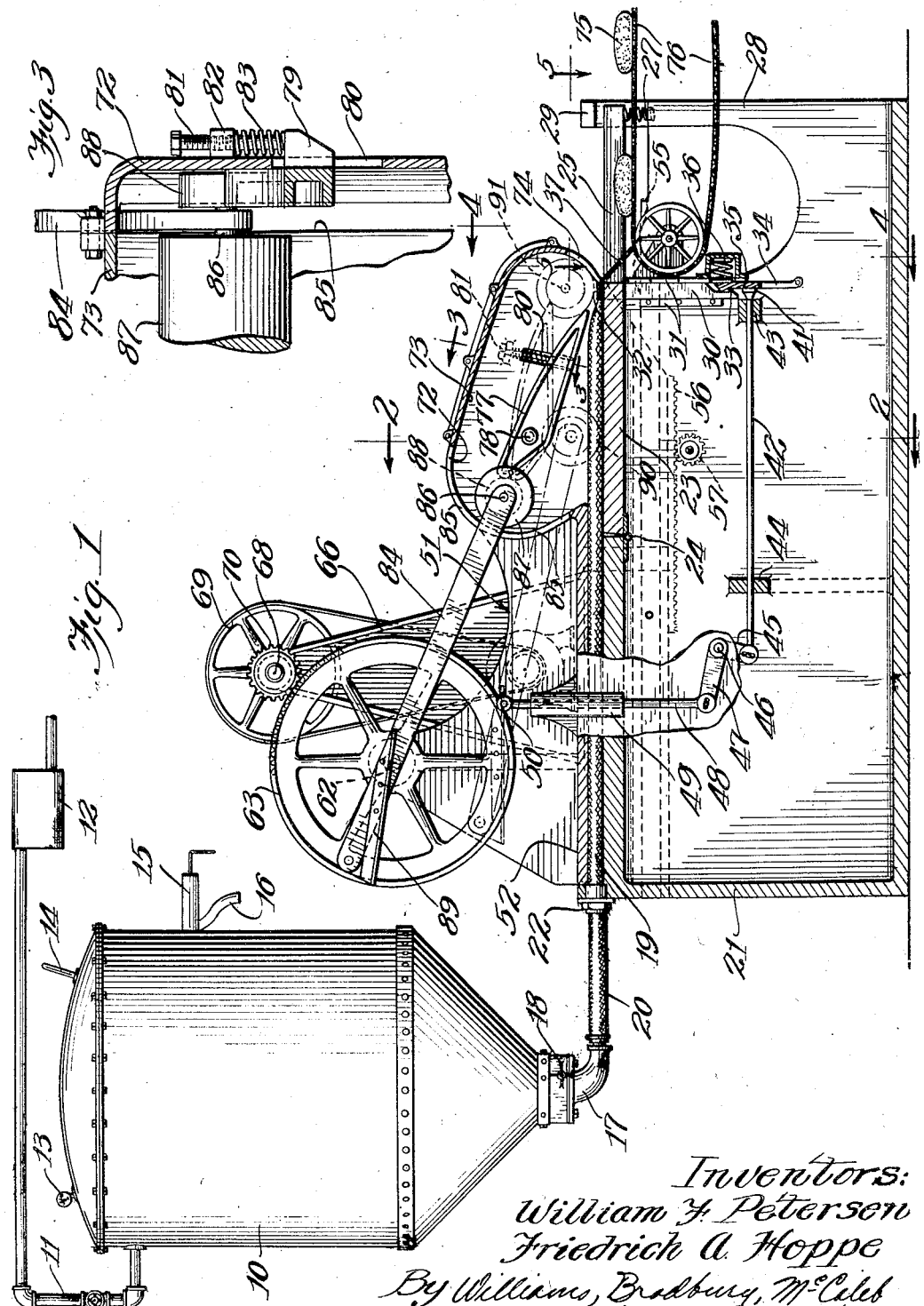

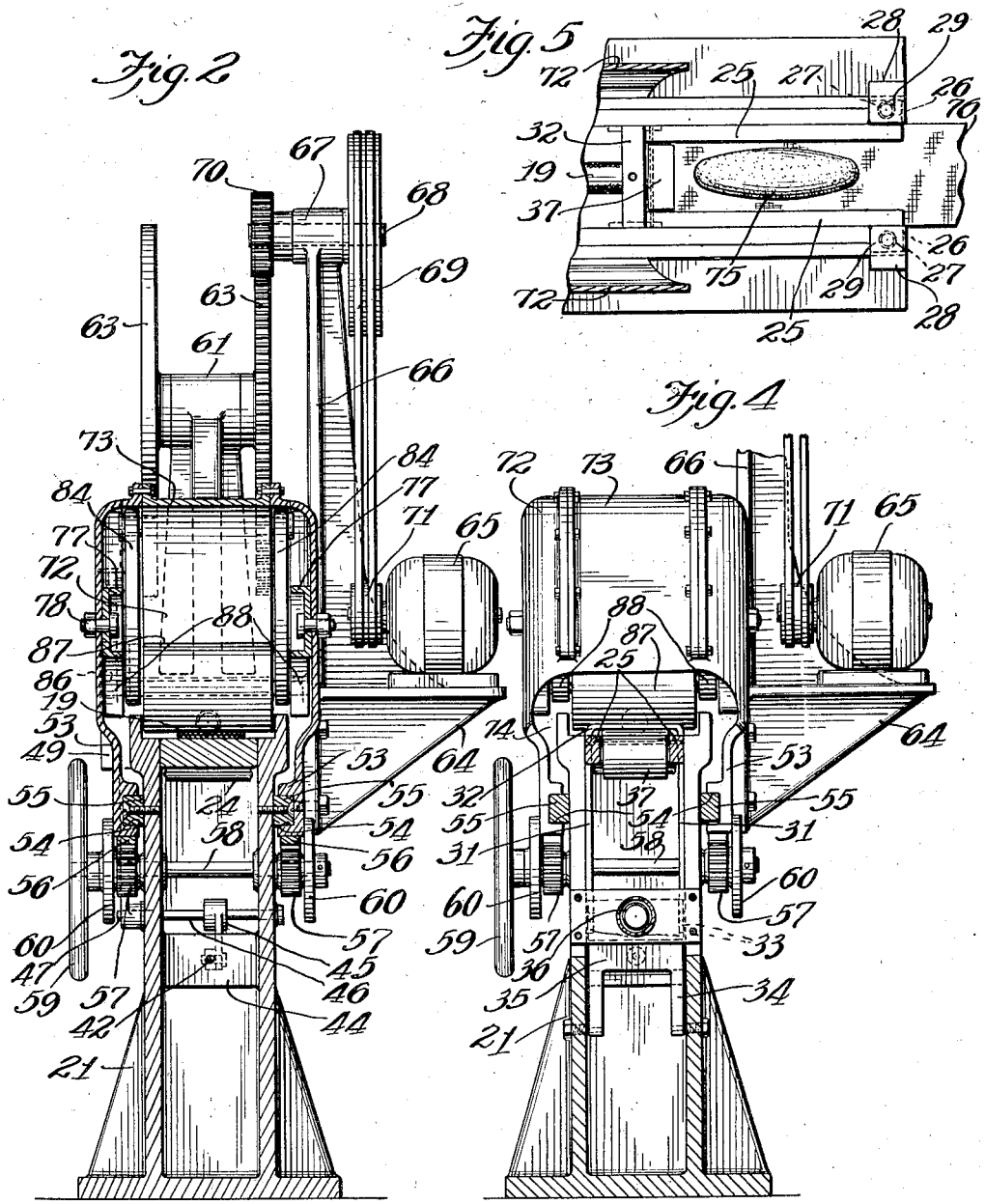

1,926,061

UNITED STATES PATENT OFFICE 1,926,061

DOUGH DIVIDER

William F. Petersen and Friedrich A. Hoppe, Chicago, Ill., assignors to Schmidt Securities Company, Chicago, Ill., a corporation of Illinois Application October 5, 1931. Serial No. 566,994

12 Claims. (Cl. 107—15)

This invention relates to an apparatus for dividing dough into pieces of equal size for the manufacture of loaves, rolls or other forms of bread therefrom.

One of the objects of the invention is to provide a dough divider which subjects the dough to less punishment than do dividers of the ordinary type.

A further object of the invention is to provide a dough divider which is relatively small, inexpensive, simple to operate, and has a relatively large capacity.

Other objects, advantages, and capabilities of the invention will appear from the following description of a preferred embodiment thereof, taken in conjunction with the accompanying drawings, in which:

Figure 1 is a longitudinal sectional elevation through a dough divider embodying our invention connected to an apparatus adapted to supply dough thereto;

Fig. 2 is a transverse sectional view of the dough divider taken on the line 2—2 of Fig. 1;

Fig. 3 is a sectional detail view taken on the line 3—3 of Fig. 1;

Fig. 4 is a fragmentary transverse sectional view of the dough divider taken on the line 4—4 of Fig. 1; and Fig. 5 is a detail plan view taken on the line 5—5 of Fig. 1.

Referring to the drawings, the numeral 10 designates an apparatus adapted to discharge fermented dough under pressure. This apparatus preferably consists of a pressure chamber in which mixed dough comprising flour, yeast, liquid and other ingredients, is fermented in accordance with the process described in the copending application Serial No. 556,031, filed August 8, 1931, by William F. Petersen, so as to develop an internal pressure due to the production of carbonic acid gas. If desired the pressure can be provided or augmented by air or other gas introduced by the valved pipe 11, which gas may be supplied under pressure by a pump 12. The pressure chamber 10 is preferably provided with a pressure indicator 13, a thermometer 14, and a safety valve 15, which comprises an outlet 16 to permit escape of dough to draw the operator's attention to excessive pressure. The pressure chamber 10 is provided at its lower end with a dispensing outlet 17 controlled by a valve 18 which may be set to control the flow of dough from the chamber 10. It will readily be understood from the following description that the pressure may be applied to the dough by mechanical or other suitable means.

The dough passes through the divider in a hose or flexible conduit 19 which may be connected to the dispensing outlet 17 by a hose or flexible conduit 20. The hose 19 lies upon the upper surface of a table or base 21, and is provided at its rear end with a coupling 22 which may be rigidly secured to the table 21. The hoses 19 and 20 may suitably be made of fabric and rubber so as to provide flexibility combined with sufficient strength to withstand the pressures employed. Hose of the type employed for fire hose are suitable for our purposes. The portion 23 of the table 21 which supports the forward end of the hose 19 is pivoted to the table at 24. At its forward end the pivoted portion 23 carries on each side forwardly directed rails 25 which carry offset ends 26. The ends 26 are resiliently supported by springs 27 which may be mounted on standards 28 which may be integral with the side walls of the table 21. The standards 28 are provided with inwardly directed lugs 29 which engage the upper sides of the rails 25 and provide stops to limit the uppermost position of the pivoted portion 23 of the table 21.

An inverted U-shaped stirrup 30 is located at the forward end of the table, its vertical legs being guided by strips 31 secured to the inner sides of the table 21. The horizontal portion 32 of the stirrup 30 extends over the hinged portion 23 of the table 21 and is adapted to compress the hose 19 thereagainst to close the hose, in the manner shown in Fig. 1. The upper side of the hose 19 may be riveted or otherwise secured to the horizontal portion 32 of the stirrup 30. The legs of the stirrup 30 are provided at their lower ends with forwardly directed teeth 33, which are adapted to be engaged by latches 34. The latches 34 are pivotally mounted on the table 21 and are connected by a bridge piece 35 through which they are pressed rearwardly by a spring 36. The ends of the legs of the stirrup 30 and the upper ends of the latches 34 are chamfered or inclined so that, when the stirrup is forced downwardly in the manner hereinafter described, the latches 34 are pressed forwardly so as to engage the teeth 33 and hold the stirrup in its lowest position until they are released.

The bridge piece 35 is engaged by a head 41 of a rod 42 slidably mounted in webs 43 and 44 within the table 21. The rod 42 is pivotally connected to the slotted end of an arm 45 which is rigidly mounted on a transverse shaft 46 rotatably mounted on the table 21. The shaft 46 projects outwardly from the left hand side of the table as shown in Fig. 2 and the projecting end rigidly carries an arm 47, the outer end of which is slotted and pivotally connected to a vertical rod 48 guided in a boss 49 formed on the table 21. The rod 48 projects above the surface of the table 21 and its upper end is provided with a roller 50.

The operative elements of the divider are carried by a main frame 51 which may suitably be a casting. This frame comprises a horizontal portion 52 from which depend side webs 53 which are provided with longitudinal inwardly directed slides 54 which engage guide rails 55 mounted on the side of the table so that the main frame 51 may slide longitudinally thereon. Racks 56 are mounted on the lower edges of the side webs 53, which mesh with pinions 57 keyed to a shaft 58 which has bearings in the sides of the table 21. A hand wheel 59 mounted on the shaft 58 enables the position of the frame 51 on the table 21 to be adjusted at will. Discs 60 mounted on the shaft 58 engage and guide the outer sides of the side webs 53, and prevent any tendency of the side webs to spread.

The main frame 51 provides a bearing 61 for a horizontal shaft 62 which carries a pair of wheels 63 one on each side of the hose 19. One of the side webs 53 has secured thereto a bracket 64 which supports an electric motor 65 and carries a standard 66. The standard 66 provides a bearing 67 for a horizontal shaft 68, on one end of which is keyed a pulley 69 and on the other end of which is keyed a pinion 70. The pulley 69 is operatively connected to the pulley 71 of the motor 65. The pinion 70 meshes with the adjacent wheel 63 which is provided with gear teeth around its periphery.

The forward end of the main frame 51 is formed into a housing 72 which is preferably provided with a removable section 73. The housing 72 is provided with an opening 74 at its forward end to permit the discharge of the divided pieces of dough 75 which are deposited on a conveyor 76 placed to receive them. A flap 37 may be mounted on the forward end of the pivoted portion 23 of the table 21, to guide the pieces of dough onto the conveyor. A cam 77 is pivotally mounted on each side of the housing 72 and within the same, by means of a bolt 78. Each cam 77 carries a lug 79 which projects through a slot 80 in the adjacent side wall of the housing 72, the slot being concentric with the bolt 78. Bolts 81 threadedly mounted in lugs 82 on the exterior of the housing 72 are adapted to engage the lugs 79 and serve as rigid abutments to limit the counterclockwise rotation of the cams 77 as viewed in Fig. 1. In this position the undersides of the cams 77 are substantially horizontal as shown in dash dot lines in Fig. 1. A coil spring 83 is located around each bolt 81 so as to tend to cause the cam 77 to assume the position shown in full lines in Fig. 1.

A link 84 is pivotally connected to the outer side of each wheel 63 adjacent the periphery thereof. These links extend into the housing 72 through slots 85 and are located therein immediately on the inner sides of the cams 77. The forward ends of the links 84 are connected within the housing 72 by a horizontal shaft 86 which carries between the links 84 a roller 87 and at each end a cam roller 88 which rides over the surface of the adjacent cam 77.

The link 84 on the left hand side of the machine as viewed in Fig. 2 has secured thereto adjacent its pivotal connection with the wheel 63, an angle iron 89 which is adapted to engage the roller 50 of the rod 48 in the manner shown in dotted lines in Fig. 1, depress the rod and release the latches 34. The elements are preferably so related that angle iron 89 is horizontal when the release occurs.

The operation is as follows: A batch of dough having been fermented in one of the containers 10, and a suitable pressure, for example about 50 lbs. per square inch, having been developed within the dough, the outlet 17 is connected by the hose 20 to the hose 19. The valve 18 is then opened to a suitable extent to permit the pressure to cause the dough to flow into the hose 19. The conveyor 76 and the motor 65 are then started, and simultaneously the pump 12 is started and controlled to maintain constant pressure in the tank 10.

The motor drives the wheels 63 in counterclockwise direction as viewed in Fig. 1 which causes the links 84 to reciprocate into and out of the housing 72, the free ends thereof being guided by engagement of the cam rollers 88 with the cams 77. In the position shown in full lines in Fig. 1 the cam rollers 88 are moving downwards and just clearing the rear noses of the cams 77. At this time the stirrup 30 is held in its downward position by the latches 34 and the end of the hose 19 is closed thereby. As the rotation of the wheels 63 continues the cam rollers 88 move into the position indicated at 90, and engage the underside of the cams 77 which are thereby moved into abutment with the bolts 81 so that the cams occupy the position shown in dash dot lines in Fig. 1. This engagement between the cams and cam rollers causes the roller 87 to press against the hose at the position 90 and thereby close the hose.

At this time the angle iron 89 engages the roller 50 of the rod 48 and the latches 34 are forced forwardly to release the stirrup 30. The continued rotation of the wheels 63 causes the roller to move to the right as viewed in Fig. 1 and apply pressure along the hose 19 between the position 90 and the end of the hose, to expel the portion of dough located therebetween. The piece of dough 75 thus formed falls on to the conveyor 76 and is moved away from the machine.

As the roller 87 reaches the position 91 it engages the stirrup 30 and latches same in its lowermost position, the angle iron 89 having at this time moved out of contact with the roller 40. Immediately thereafter the cam rollers 88 clear the forward noses of the cams 77, which then assume the position shown in full lines in Fig. 1. The direction of movement of the links 84 is then reversed and the rollers 88 ride up over the upper surfaces of the cams 77 and the cycle of operations described is repeated indefinitely, each cycle resulting in the discharge of a piece of dough 75 upon the conveyor 76.

The size of the pieces of dough 75 can be adjusted within a wide range by means of the hand wheel 59. It will readily be seen from Fig. 1 that if the main frame 51 is moved to the right, the position 90, at which the roller 87 closes the hose 19, also moves to the right and that the size of the piece of dough enclosed between the roller 87 in its position 90 and the stirrup 30 is correspondingly decreased.

It may here be noted that the release of the latches 34 occurring when the angle iron 89 is horizontal is independent of the location of the frame 51 on the table 21. It may also be pointed out that when the machine is set for small pieces of dough the angle iron 89 moves forwardly past the roller 50 to release same, before the roller 87 reaches the stirrup 30. When the machine is set for large pieces of dough the roller 50 is disengaged by the angle iron 89 owing to the upward movement of the same with the link 84.

During the extrusion of the dough the pivotal mounting of the portion 23 of the table and its resilient support by the springs 27 prevents excessive forces from being developed owing to the presence of foreign matter or imperfections of the coacting surfaces. It will be understood that the springs 27 are sufficiently strong to maintain a seal between the portion 23 and the roller 87 and the stirrup 30. The resilient mounting of the portion 23 insures a perfect closing of the forward end of the hose by the horizontal portion 32 of the stirrup 30 and compensates for any play due to wear or other causes.

When the dough is fermented under pressure in the chamber 10 in accordance with the process of the aforesaid application, a great number of minute bubbles of carbon dioxide under pressure are developed throughout the mass of the dough. During the extrusion the dough expands longitudinally and the bubbles become elongated providing an improved cellular structure in the resulting breadstuffs. Thus the dough dividing operation is effected with increasing volume and the dough is not punished to anything like the same extent as with the usual forms of dough dividers, so that the usual proofing period subsequent to dividing may be omitted or considerably curtailed. It will readily be understood that in this method of operation the dough is fermented and divided without appreciable change of volume and while under pressure, and that the pressure is released so as to permit the dough to expand after dividing.

Although the invention has been described in connection with the specific details of a preferred embodiment thereof, it must be understood that such details are not intended to be limitative of the invention, except insofar as set forth in the accompanying claims.

Having thus described our invention what we claim as new and desire to secure by Letters Patent is:

1. A dough divider comprising a flexible conduit adapted for the passage of dough therethrough, means adjacent the end of the conduit adapted to interrupt the passage of dough therefrom, and means adapted to close the conduit at a point spaced from the end and expel the dough between that point and the end.

2. A dough divider comprising a base, a frame adjustably mounted thereon, means providing a passage for a stream of dough, means mounted on the base for interrupting the stream, and means mounted on the frame for interrupting the stream to divide same into separate pieces, the size of the pieces being controlled by adjustment of position of the frame on the base.

3. In combination, means adapted to supply dough under pressure, a flexible conduit through which the dough is adapted to pass, a pair of frame members adapted for relative adjustment in the direction of the conduit, means on one frame adapted to close intermittently the end of the conduit, and means on the other frame adapted to close intermittently the conduit at a point spaced apart from the end and to expel the dough between said point and end.

4. In combination, a chamber adapted for the fermentation of dough with the development of internal pressure, a flexible conduit adapted for the passage of dough therethrough under said pressure, and means adapted to crimp the conduit at spaced points for interrupting said passage to subdivide the dough into pieces of regular size.

5. A dough divider comprising a flexible conduit through which dough is adapted to be passed, movable means at the end of the hose adapted to close same, movable means adapted to close said conduit at a distance from the end and move towards same, means interconnecting the movable means so that the former moves to open position when the latter closes the conduit, the latter movable means being adapted to close the former movable means when it reaches the end of the conduit.

6. A dough divider comprising a flexible conduit through which dough is adapted to be passed, a member located at the end of the hose and adapted to close same, a latch adapted to hold the member in closing position, a roller adapted to engage said conduit at a distance from the end and move towards same to extrude a piece of dough, means associated with the drive of the roller adapted to unlatch the conduit when the roller closes same, said roller being adapted to pass over said member and return same to latched position.

7. In a dough divider, in combination, a flexible conduit for dough, a member adapted to move thereover to extrude the dough, means to reciprocate the member, and a cam adapted to cause the member to move in a circuitous path.

8. In a dough divider, in combination, a pitman, a cam adapted to cooperate with the free end of the pitman, said cam being pivotally mounted to cause said free end to move forward below and backward above the cam, a conduit for dough, and a member carried by said free end to cause the extrusion of dough during said forward movement.

9. In a dough divider, in combination, a flexible conduit for dough, a resilient support therefor, a member adapted to move over the conduit to extrude the dough therefrom, means to reciprocate the member, and a cam adapted to cause the member to move in a circuitous path.

10. A dough divider comprising a flexible conduit adapted for the passage of dough therethrough, and means at spaced points for interrupting the passage of dough at spaced points of the conduit to divide the same into separate pieces, one of said means being operated by the other.

11. A dough divider comprising a flexible conduit adapted for the passage of dough therethrough, and means at spaced points for interrupting the passage of dough to divide the same into separate pieces, one of said means being movable along the conduit to apply a constriction progressively therealong and to close the other means.

12. In combination, means adapted to supply dough under pressure, a conduit through which the dough is adapted to pass, a pair of relatively adjustable members associated with said conduit, means on one of said members adapted to close intermittently the end of the conduit, and means on the other member adapted to close intermittently the conduit at a point spaced apart from the end, the second said closing means being adapted to operate the first said closing means.

WILLIAM F. PETERSEN.
FRIEDRICH A. HOPPE.